(No Model.)
H. STILL.
SCUFFLE HOE.
No. 289,723. Patented Dec. 4, 1883.
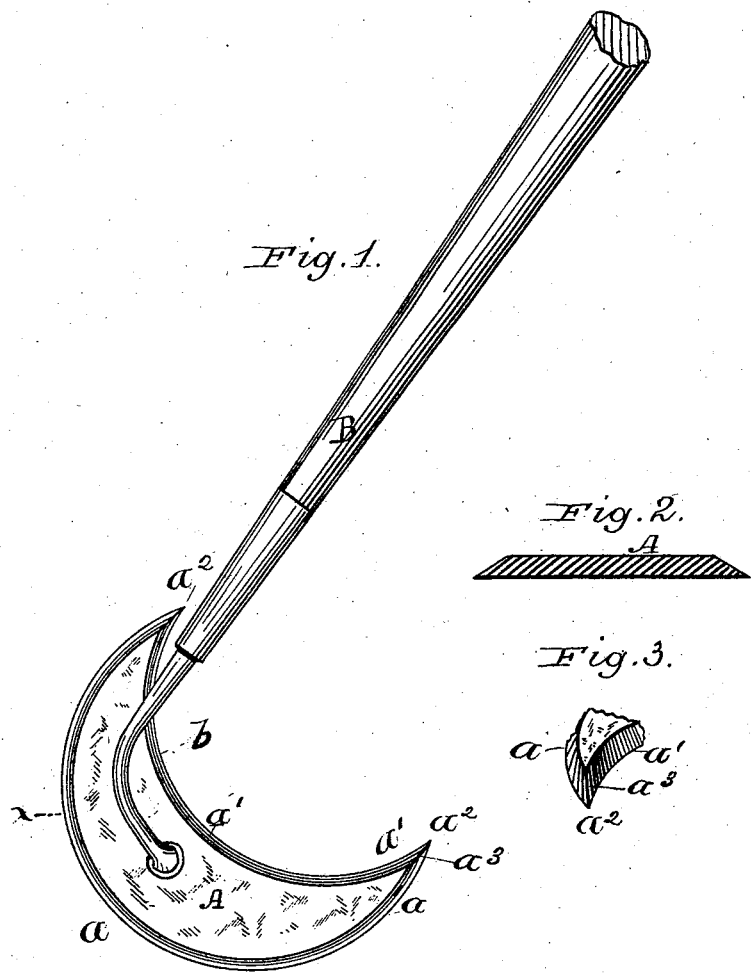
Witnesses
L. E. Hills
E. E. Masson
Inventor
Henry Still
By E. B. Stoering
Atty

UNITED STATES PATENT OFFICE.

HENRY STILL, OF BELOIT, KANSAS.

SCUFFLE-HOE.

SPECIFICATION forming part of Letters Patent No. 289,723, dated December 4, 1883.

Application filed April 30, 1883. (No model.)

*To all whom it may concern:*

Be it known that I, HENRY STILL, a citizen of the United States, residing at Beloit, in the county of Mitchell and State of Kansas, have invented certain new and useful Improvements in Scuffle-Hoes, of which the following is a specification, reference being had therein to the accompanying drawings, which are illustrations of a hoe constructed in accordance with my invention—

Figure 1 being a perspective; Fig. 2, a section on the line $x$ of Fig. 1, and Fig. 3 an enlarged view of a point of the blade.

A represents the blade, and B the handle. The blade is a true crescent in outline, and is beveled from its upper to its lower surface, thus producing a cutting-edge, $a$, at the front which is convex, and a cutting-edge, $a'$, at the back which is concave, and two sharp points, $a'$, having three cutting-edges each—that is to say, an inner and an outer edge, and an upper edge formed by or at the line when the bevels of the blade merge into each other, as at $a^3$. The handle B may be brazed to, formed integrally with, or headed, upset, or riveted in a hole formed in, the blade, and it may be more or less curved, as shown at $b$, to present the blade at a suitable angle when in use.

The operation and advantages of my construction of blades are as follows: By a reciprocating movement the cutting-edge is presented most advantageously to cut in any direction, and if, as is common, either of the points enter the stalk of a weed or plant or a large tough root, their peculiar conformation, having three inclined edges, renders them not only extremely penetrating, but strong against fracture, and enables the operator to sever stalks and roots on either hand without changing his position, which otherwise would require an outlay of more force, and tend to spring or break the blade or its points, or require unnecessary changing of the position of the operator.

I am aware that diamond-shaped blades have been constructed, and do not claim such as of my invention, and prefer a true crescent shape, as in the former a tendency of the blade to pass by an obstruction or stalk requires lateral pressure as well as longitudinal force to accomplish the work. A pair of circular blades have also been constructed and provided with means for adjusting them relatively one with the other; but in this instance a convex enlargement or projection was formed on the rear cutting-edge, and other features of construction were embodied adding to the complexity and disadvantage of the hoe. I do not therefore claim, broadly, a circular blade as of my invention.

I am aware that a true crescent blade sharpened on the concave side only, and having the handle attached to the convex side, has hitherto been constructed, and do not claim the same as of my invention; but What I do claim as new is—

As a new article of manufacture, a hoe comprising a blade having a true crescent outline beveled from its upper surface outwardly to its lower surface, producing the cutting-edges $a$ $a'$ $a^3$, and a bent handle secured centrally thereto, whereby the three-edged penetrating and cutting points $a^2$ $a^2$ and unobstructed curved front and rear cutting-edges are provided, substantially as shown and described.

In testimony whereof I affix my signature in presence of two witnesses.

HENRY STILL.

Witnesses:
H. A. YONGE,
J. H. AUTROBUS.